US012666440B2

(12) United States Patent
Wang et al.

(10) Patent No.:  US 12,666,440 B2
(45) Date of Patent:  Jun. 23, 2026

(54) METHOD AND DEVICE FOR SIGNAL TRANSMISSION

(71) Applicant: ZTE CORPORATION, Shenzhen (CN)

(72) Inventors: Yuxin Wang, Shenzhen (CN); Zhaohua Lu, Shenzhen (CN); Xiyu Wang, Shenzhen (CN); Gang Li, Shenzhen (CN); Chuangxin Jiang, Shenzhen (CN); Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 667 days.

(21) Appl. No.: 18/168,368

(22) Filed: Feb. 13, 2023

(65) Prior Publication Data

US 2023/0199798 A1      Jun. 22, 2023

Related U.S. Application Data

(63) Continuation of application No. PCT/CN2020/119917, filed on Oct. 9, 2020.

(51) Int. Cl.
*H04W 72/232* (2023.01)
*H04L 5/00* (2006.01)
(Continued)

(52) U.S. Cl.
CPC ......... *H04W 72/232* (2023.01); *H04L 5/0048* (2013.01); *H04W 52/325* (2013.01); *H04W 52/54* (2013.01); *H04W 72/12* (2013.01)

(58) Field of Classification Search
CPC ... H04W 72/20; H04W 72/23; H04W 72/232; H04W 52/30; H04W 52/32;
(Continued)

(56) References Cited

U.S. PATENT DOCUMENTS

2015/0016317 A1* 1/2015 Park ................... H04W 52/248
                                                    370/280
2016/0112960 A1* 4/2016 Park ................... H04W 52/325
                                                    370/329
(Continued)

FOREIGN PATENT DOCUMENTS

CN        102739353 A    10/2012
CN        110710281 A     1/2020
WO   WO-2020/039334 A1    2/2020

OTHER PUBLICATIONS

3rd Generation Partnership Project, "Technical Specification Group Radio Access Network; NR; Multiplexing and channel coding (Release 16)", 3GPP TS 38.212, V16.3.0, Sep. 2020, Valbonne, France (152 pages).

(Continued)

*Primary Examiner* — Warner Wong
(74) *Attorney, Agent, or Firm* — Foley & Lardner LLP

(57)                    ABSTRACT

Presented are systems and methods for signal transmission. A wireless communication device may receive downlink control information (DCI) from the wireless communication node. The DCI may comprise a plurality of blocks, each one or more blocks of the plurality of blocks for a respective wireless communication device. The wireless communication device may receive the DCI to trigger an aperiodic sounding reference signal (SRS). The wireless communication device may receive a configuration from the wireless communication node via higher layer signaling. The wireless communication device may receive the configuration to configure parameter srs-TPC-PDCCH-Group as typeA, typeB, typeC or typeD.

16 Claims, 6 Drawing Sheets

(51) Int. Cl.

| | | |
|---|---|---|
| *H04W 52/32* | (2009.01) | |
| *H04W 52/54* | (2009.01) | |
| *H04W 72/12* | (2023.01) | |

(58) Field of Classification Search
CPC ... H04W 52/325; H04W 52/04; H04W 52/54; H04W 52/545; H04W 72/00; H04W 72/12; H04W 72/121; H04W 4/50; H04W 4/20; H04W 28/12; H04L 5/003; H04L 5/0048; H04L 5/005; H04L 5/0051; H04L 41/08; H04L 41/0803; H04L 25/0224; H04L 2025/03783; H04L 2027/0083; H04L 27/261; H04L 41/34
See application file for complete search history.

(56) References Cited

U.S. PATENT DOCUMENTS

| | | | | |
|---|---|---|---|---|
| 2016/0192356 | A1* | 6/2016 | Lee | H04L 5/1469 |
| | | | | 370/280 |
| 2017/0222776 | A1 | 8/2017 | Dinan | |
| 2017/0264402 | A1* | 9/2017 | Papasakellariou | H04W 74/006 |
| 2019/0289513 | A1* | 9/2019 | Jeon | H04W 72/0453 |
| 2020/0036556 | A1* | 1/2020 | Wei | H04W 72/21 |
| 2020/0127777 | A1 | 4/2020 | Papasakellariou | |
| 2020/0244335 | A1* | 7/2020 | Nilsson | H04B 7/0695 |
| 2020/0358576 | A1* | 11/2020 | Zarifi | H04L 5/0051 |
| 2021/0336820 | A1* | 10/2021 | Lim | H04W 80/02 |
| 2021/0359819 | A1* | 11/2021 | Xiao | H04W 72/23 |
| 2022/0045884 | A1* | 2/2022 | Lin | H04L 5/0098 |
| 2022/0231812 | A1* | 7/2022 | Go | H04W 52/325 |
| 2022/0368491 | A1* | 11/2022 | Shi | H04L 5/0092 |
| 2023/0066566 | A1* | 3/2023 | Yuan | H04B 7/0456 |
| 2023/0179372 | A1* | 6/2023 | Liu | H04L 5/0051 |
| | | | | 370/330 |
| 2023/0199800 | A1* | 6/2023 | Liu | H04L 5/0051 |
| | | | | 370/329 |
| 2023/0209571 | A1* | 6/2023 | Liu | H04L 5/0078 |
| | | | | 370/329 |
| 2023/0232339 | A1* | 7/2023 | Fakoorian | H04W 52/325 |
| | | | | 455/522 |
| 2023/0246784 | A1* | 8/2023 | Tamrakar | H04W 16/28 |
| | | | | 370/329 |
| 2023/0318770 | A1* | 10/2023 | Liu | H04L 5/0048 |
| | | | | 370/329 |
| 2023/0379118 | A1* | 11/2023 | Nilsson | H04L 5/0007 |
| 2024/0014972 | A1* | 1/2024 | Matsumura | H04W 72/232 |
| 2024/0163897 | A1* | 5/2024 | Wang | H04W 72/232 |
| 2025/0267043 | A1* | 8/2025 | Kwak | H04W 72/046 |

OTHER PUBLICATIONS

Extended European Search Report for EP Appl. No. 20956494.7, dated Jul. 28, 2023 (9 pages).

Office Action for KR Appl. No. 10-2023-7005524, dated May 30, 2025 (with English translation, 8 pages).

3GPP: "Multiplexing and channel coding (Release 16)" Technical Specification Group Radio Access Network; NR; 3GPP TS 38.212 V16.3.0; Sep. 2020; Valbonne, France (152 pages).

Huawei, "(TP for BL CR for TS 38.455) Support of aperiodic SRS" 3GPP TSG-RAN3 Meeting #109-e, R3-204970, Aug. 28, 2020, E-meeting (13 pages).

International Search Report and Written Opinion for PCT Appl. No. PCT/CN2020/119917 mailed Jul. 7, 2021 (9 pages).

Moderator (AT&T), "Summary of UE features for eMIMO", 3GPP TSG RAN WG1 #101, R1-2004285, Jun. 5, 2020, e-Meeting (54 pages).

OPPO, "PDCCH enhancement for URLLC", 3GPP TSG RAN WG1 #100bis, R1-2001773, Apr. 30, 2020, e-Meeting (14 pages).

Qualcomm Incorporated, "Discussion on NR Rel-16 UE features", 3GPP TSG RAN WG1 #102-e, R1-2006788, Aug. 28, 2020, e-Meeting (85 pages).

Qualcomm Incorporated, "Enhancements on SRS flexibility, switching, coverage and capacity", 3GPP TSG-RAN WG1 Meeting #102-e, R1-2006795, Aug. 28, 2020, e-Meeting (27 pages).

Qualcomm Incorporated: "Maintenance for SRS" 3GPP TSG RAN WG1 Meeting #92; R1-1802830; Feb. 26-Mar. 2, 2018; Athens, Greece (6 pages).

Qualcomm: "Discussion on Type-A and Type-B Carrier Switching" 3GPP TSG RAN WG1 Meeting #100b-e; R1-2002522; Apr. 20-May 1, 2020; e-meeting (6 pages).

VIVO, "Discussion on SRS enhancement", 3GPP TSG RAN WG1 #102-e, R1-2005368, Aug. 28, 2020, e-Meeting (17 pages).

Office Action for ID Appl. No. P00202301416, dated Oct. 21, 2025 (with English translation, 6 pages).

First Office Action for CN Appl. No. 202080105482.0, dated Aug. 9, 2025 (with English translation, 21 pages).

* cited by examiner

300

| TPC Command Field | Selected slotOffset |
|---|---|
| 0 | slotOffset(s) configured with higher layer parameter slotOffset Trigger set to 0 |
| 1 | slotOffset(s) configured with higher layer parameter slotOffset Trigger set to 1 |
| 2 | slotOffset(s) configured with higher layer parameter slotOffset Trigger set to 2 |
| 3 | slotOffset(s) configured with higher layer parameter slotOffset Trigger set to 3 |

FIG. 3

| TPC Command Field | Selected slotOffset |
|---|---|
| 0 | The first slotOffset |
| 1 | The second slotOffset |
| 2 | The third slotOffset |
| 3 | The fourth slotOffset |

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | -1 | -4 |
| 1 | 0 | -1 |
| 2 | 1 | 1 |
| 3 | 3 | 4 |

652 Receive DCI to trigger aperiodic SRS

654 Receive configuration to configure srs-TPC-PDCCH-Group

METHOD AND DEVICE FOR SIGNAL TRANSMISSION

CROSS-REFERENCE TO RELATED APPLICATION

This application claims the benefit of priority under 35 U.S.C. § 120 as a continuation of PCT Patent Application No. PCT/CN2020/119917, filed on Oct. 9, 2020, the disclosure of which is incorporated herein by reference in its entirety.

TECHNICAL FIELD

The disclosure relates generally to wireless communications, including but not limited to systems and methods for signal transmission.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium. A wireless communication device may receive downlink control information (DCI) from the wireless communication node. The wireless communication device may receive the DCI to trigger an aperiodic sounding reference signal (SRS). The wireless communication device may receive a configuration from the wireless communication node via higher layer signaling. The wireless communication device may receive the configuration to configure parameter srs-TPC-PDCCH-Group as typeA, typeB, typeC or typeD.

In some embodiments, the wireless communication device may transmit at least one of a physical uplink shared channel (PUSCH) transmission or a physical uplink control channel (PUCCH) transmission, in a component carrier (CC) of the SRS, to the wireless communication node. In some embodiments, the wireless communication device may transmit at least one of a PUSCH transmission or a PUCCH transmission, in a CC of the SRS, according to the configured parameter srs-TPC-PDCCH-Group. In some embodiments, the DCI may comprise a plurality of blocks, each (set of) one or more blocks of the plurality of blocks for a respective wireless communication device.

In some embodiments, SRS power control may be tied with a PUSCH power control. In some embodiments, when SRS power control is tied with the PUSCH power control, a first block of the plurality of blocks may comprise a SRS request field associated with a set of component carriers (CCs) of the wireless communication device. In some embodiments, when SRS power control is tied with the PUSCH power control, a first block of the plurality of blocks may comprise a plurality of transmit power control (TPC) command fields including a first TPC command field. In some embodiments, each of the TPC command fields may be associated with a respective CC of the set of CCs. In some embodiments, when SRS power control is tied with the PUSCH power control, a first block of the plurality of blocks may comprise a SRS request field associated with a CC of the wireless communication device. In some embodiments, when SRS power control is tied with the PUSCH power control, a first block of the plurality of blocks may comprise a first TPC command field associated with the CC.

In some embodiments, a usage of the first TPC command field may be configured/set to comprise at least one of: slotOffset, SRSFreqDomainConfig, SRSTimedomainConfig, resourceMapping, TCI state, or SpatialRelationInfo. In some embodiments, a usage of the plurality of TPC command fields may be configured as slotOffset. In some embodiments, a value of each of the plurality of TPC command fields may correspond to a respective set of one or more slot offsets. In some embodiments, a usage of the plurality of TPC command fields may be configured as SpatialRelationInfo, TCI state, SRSTimedomainConfig or resourceMapping. In some embodiments, a value of each of the plurality of TPC command fields may correspond to a respective parameter set of SpatialRelationInfo, TCI state, SRSTimedomainConfig or resourceMapping.

In some embodiments, SRS power control may not be tied with a PUSCH power control. In some embodiments, if SRS power control is not tied with the PUSCH power control, a first block of the plurality of blocks may comprise a SRS request field associated with a CC of the wireless communication device. In some embodiments, if SRS power control is not tied with the PUSCH power control, a first block of the plurality of blocks may comprise a first TPC command field associated with the CC. In some embodiments, a value of the SRS request field may be used to trigger the SRS in the CC in which at least one of a PUSCH transmission or PUCCH transmission can be scheduled. In some embodiments, each monitoring cell for monitoring a PDCCH transmission to convey a corresponding DCI may comprise a corresponding CC in which at least one of the PUSCH transmission or a PUCCH transmission can be scheduled. In some embodiments, each monitoring cell comprising the corresponding CC in which at least one of the PUSCH transmission or a PUCCH transmission can be scheduled may be different from a monitoring cell for monitoring a PDCCH transmission to convey a corresponding DCI which comprises a corresponding CC without the PUSCH transmission or the PUCCH transmission scheduled.

In some embodiments, SRS power control may not be tied with a PUSCH power control. In some embodiments, if SRS power control is not tied with the PUSCH power control, a first block of the plurality of blocks may comprise a SRS request field associated with a set of CCs of the wireless communication device. In some embodiments, if SRS power control is not tied with the PUSCH power control, a first block of the plurality of blocks may comprise a plurality of TPC command fields including a first TPC command field. In some embodiments, each of the TPC command fields may be associated with a respective CC of the set of CCs. In some embodiments, at least one of a PUSCH transmission or a PUCCH transmission can be scheduled in the CC set. In some embodiments, monitoring cells for monitoring PDCCH transmissions to convey corresponding DCIs may comprise the CC set in which at least one of the PUSCH transmission or the PUCCH transmission can be scheduled. In some embodiments, monitoring cells comprising the CC set in which at least one of the PUSCH transmission or the PUCCH transmission can be scheduled may be different from a monitoring cell for monitoring a PDCCH transmission to convey a corresponding DCI which comprises a corresponding CC without the PUSCH transmission or the PUCCH transmission scheduled.

At least one aspect is directed to a system, method, apparatus, or a computer-readable medium. A wireless communication node may transmit downlink control information (DCI) to the wireless communication device. The wireless communication node may transmit the DCI to trigger an aperiodic sounding reference signal (SRS). The wireless communication node may transmit a configuration to the wireless communication device via higher layer signaling. The wireless communication node may transmit the configuration to configure parameter srs-TPC-PDCCH-Group as typeA, typeB, typeC or typeD.

In some embodiments, the wireless communication node may receive the configured parameter srs-TPC-PDCCH-Group from the wireless communication device. In some embodiments, the wireless communication node may receive the configured parameter to schedule at least one of a physical uplink shared channel (PUSCH) transmission or a physical uplink control channel (PUCCH) transmission, in a component carrier (CC) of the SRS. In some embodiments, the DCI may comprise a plurality of blocks, each one or more blocks of the plurality of blocks for a respective wireless communication device.

In some embodiments, SRS power control may be tied with a PUSCH power control. In some embodiments, when SRS power control is tied with the PUSCH power control, a first block of the plurality of blocks may comprise a SRS request field associated with a set of component carriers (CCs) of the wireless communication device. In some embodiments, when SRS power control is tied with the PUSCH power control, a first block of the plurality of blocks may comprise a plurality of transmit power control (TPC) command fields including a first TPC command field. In some embodiments, each of the TPC command fields may be associated with a respective CC of the set of CCs. In some embodiments, when SRS power control is tied with the PUSCH power control, a first block of the plurality of blocks may comprise a SRS request field associated with a CC of the wireless communication device. In some embodiments, when SRS power control is tied with the PUSCH power control, a first block of the plurality of blocks may comprise a first TPC command field associated with the CC.

In some embodiments, a usage of the first TPC command field may be configured to comprise at least one of: slot-Offset, SRSFreqDomainConfig, SRSTimedomainConfig, resourceMapping, TCI state, or SpatialRelationInfo. In some embodiments, a usage of the plurality of TPC command fields may be configured as slotOffset. In some embodiments, a value of each of the plurality of TPC command fields may correspond to a respective set of one or more slot offsets. In some embodiments, a usage of the plurality of TPC command fields may be configured as SpatialRelation-Info, TCI state, SRSTimedomainConfig or resourceMapping. In some embodiments, a value of each of the plurality of TPC command fields may correspond to a respective parameter set of SpatialRelationInfo, TCI state, SRSTimedomainConfig or resourceMapping.

In some embodiments, SRS power control may not be tied with a PUSCH power control. In some embodiments, if SRS power control is not tied with the PUSCH power control, a first block of the plurality of blocks may comprise a SRS request field associated with a CC of the wireless communication device. In some embodiments, if SRS power control is not tied with the PUSCH power control, a first block of the plurality of blocks may comprise a first TPC command field associated with the CC. In some embodiments, a value of the SRS request field may be used to trigger the SRS in the CC in which at least one of a PUSCH transmission or PUCCH transmission can be scheduled. In some embodiments, each monitoring cell for monitoring a PDCCH transmission to convey a corresponding DCI may comprise a corresponding CC in which at least one of the PUSCH transmission or a PUCCH transmission can be scheduled. In some embodiments, each monitoring cell comprising the corresponding CC in which at least one of the PUSCH transmission or a PUCCH transmission can be scheduled may be different from a monitoring cell for monitoring a PDCCH transmission to convey a corresponding DCI which comprises a corresponding CC without the PUSCH transmission or the PUCCH transmission scheduled.

In some embodiments, SRS power control may not be tied with a PUSCH power control. In some embodiments, if SRS power control is not tied with the PUSCH power control, a first block of the plurality of blocks may comprise a SRS request field associated with a set of CCs of the wireless communication device. In some embodiments, if SRS power control is not tied with the PUSCH power control, a first block of the plurality of blocks may comprise a plurality of TPC command fields including a first TPC command field. In some embodiments, each of the TPC command fields may be associated with a respective CC of the set of CCs. In some embodiments, at least one of a PUSCH transmission or a PUCCH transmission can be scheduled in the CC set. In some embodiments, monitoring cells for monitoring PDCCH transmissions to convey corresponding DCIs may comprise the CC set in which at least one of the PUSCH transmission or the PUCCH transmission can be scheduled. In some embodiments, monitoring cells comprising the CC set in which at least one of the PUSCH transmission or the PUCCH transmission can be scheduled may be different from a monitoring cell for monitoring a PDCCH transmission to convey a corresponding DCI which comprises a corresponding CC without the PUSCH transmission or the PUCCH transmission scheduled.

In some embodiments, a group common DCI (or other DCIs) may be used to trigger/cause one or more aperiodic SRS transmissions in a CC with at least one PUSCH and/or PUCCH transmission. The CC may have/support the capability to trigger/perform at least one PUSCH and/or PUCCH transmission (e.g., PUSCH and/or PUCCH transmissions in different slots). In some embodiments, the group common DCI (or other DCIs) may be associated/related/linked to a plurality of wireless communication devices (e.g., a group of one or more UE). If the one or more aperiodic SRS transmissions are triggered (e.g., by a group common DCI), the TPC command field can be used to indicate/provide/specify the SRS configuration parameters. Therefore, the TPC command field may indicate the SRS configuration parameters (or other parameters) instead of configuring SRS power control.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIGS. 3-4 illustrate various tables of example configurations between a TPC command field value and one or more slotOffset values, in accordance with some embodiments of the present disclosure;

FIG. 5 illustrates a table of an example configuration between a TPC command field value, an accumulated power of SRS transmissions, and an absolute power of SRS transmissions, in accordance with some embodiments of the present disclosure.

DETAILED DESCRIPTION

Figure 1:
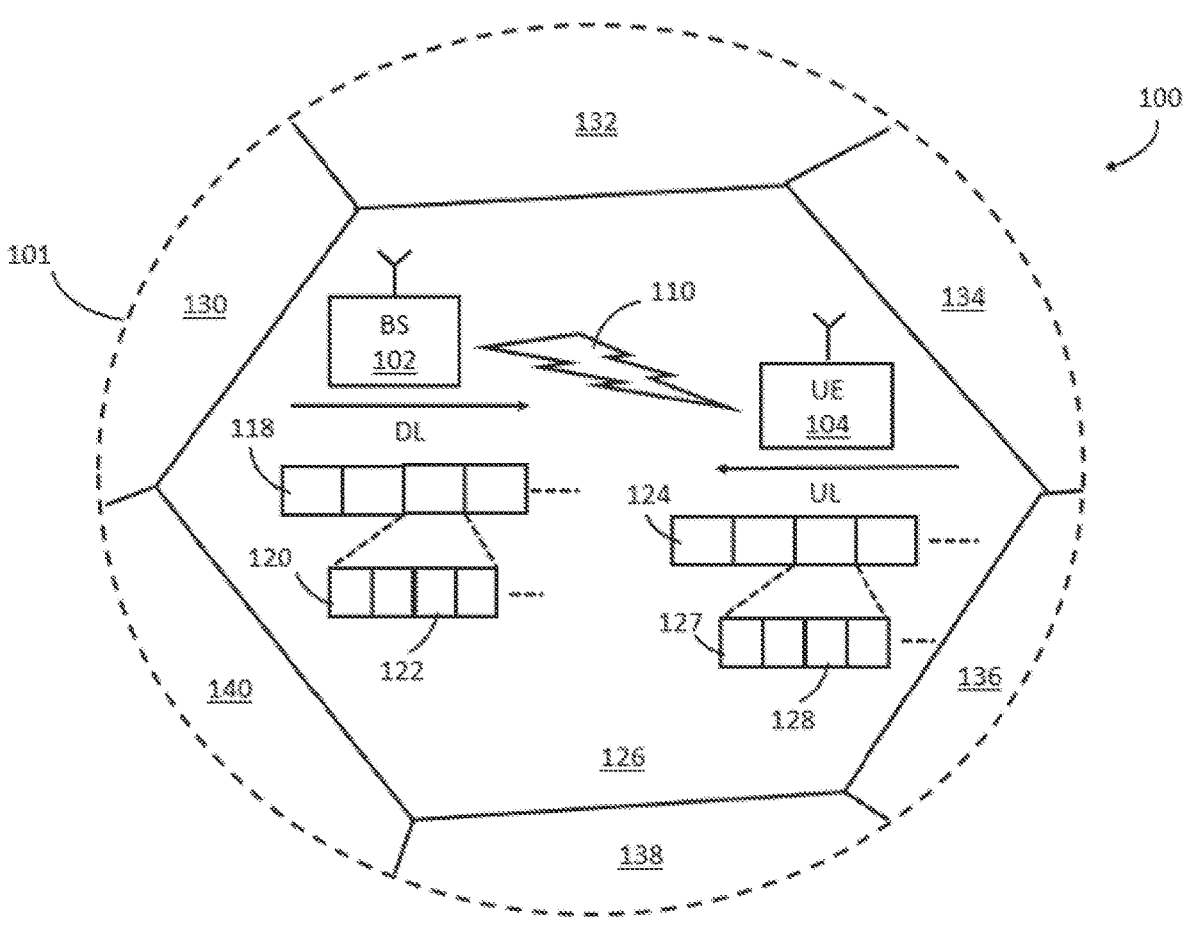
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |

-continued

| Acronym | Full Name |
| --- | --- |
| 5G-AN | 5G Access Network |
| 5G gNB | Next Generation NodeB |
| 5G-GUTI 5G- | Globally Unique Temporary UE Identify |
| AF | Application Function |
| AMF | Access and Mobility Management Function |
| AN | Access Network |
| ARP | Allocation and Retention Priority |
| CA | Carrier Aggregation |
| CM | Connected Mode |
| CMR | Channel Measurement Resource |
| CSI | Channel State Information |
| CQI | Channel Quality Indicator |
| CSI-RS | Channel State Information Reference Signal |
| CRI | CSI-RS Resource Indicator |
| CSS | Common Search Space |
| DAI | Downlink Assignment Index |
| DCI | Downlink Control Information |
| DL | Down Link or Downlink |
| DN | Data Network |
| DNN | Data Network Name |
| ETSI | European Telecommunications Standards Institute |
| FR | Frequency range |
| GBR | Guaranteed Bit Rate |
| GFBR | Guaranteed Flow Bit Rate |
| HARQ | Hybrid Automatic Repeat Request |
| MAC-CE | Medium Access Control (MAC) Control Element (CE) |
| MCS | Modulation and Coding Scheme |
| MBR | Maximum Bit Rate |
| MFBR | Maximum Flow Bit Rate |
| NAS | Non-Access Stratum |
| NF | Network Function |
| NG-RAN | Next Generation Node Radio Access Node |
| NR | Next Generation RAN |
| NZP | Non-Zero Power |
| OFDM | Orthogonal Frequency-Division Multiplexing |
| OFDMA | Orthogonal Frequency-Division Multiple Access |
| PCF | Policy Control Function |
| PDCCH | Physical Downlink Control Channel |
| PDSCH | Physical Downlink Shared Channel |
| PDU | Packet Data Unit |
| PUCCH | Physical uplink control channel |
| PMI | Precoding Matrix Indicator |
| PPCH | Physical Broadcast Channel |
| PRI | PUCCH resource indicator |
| QoS | Quality of Service |
| RAN | Radio Access Network |
| RAN CP | Radio Access Network Control Plane |
| RAT | Radio Access Technology |
| RBG | Resource Block Group |
| RRC | Radio Resource Control |
| RV | Redundant Version |
| SM NAS | Session Management Non Access Stratum |
| SMF | Session Management Function |
| SRS | Sounding Reference Signal |
| SS | Synchronization Signal |
| SSB | SS/PBCH Block |
| TB | Transport Block |
| TC | Transmission Configuration |
| TCI | Transmission Configuration Indicator |
| TRP | Transmission/Reception Point |
| UCI | Uplink Control Information |
| UDM | Unified Data Management |
| UDR | Unified Data Repository |
| UE | User Equipment |
| UL | Up Link or Uplink |
| UPF | User Plane Function |
| USS | UE Specific Search Space |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
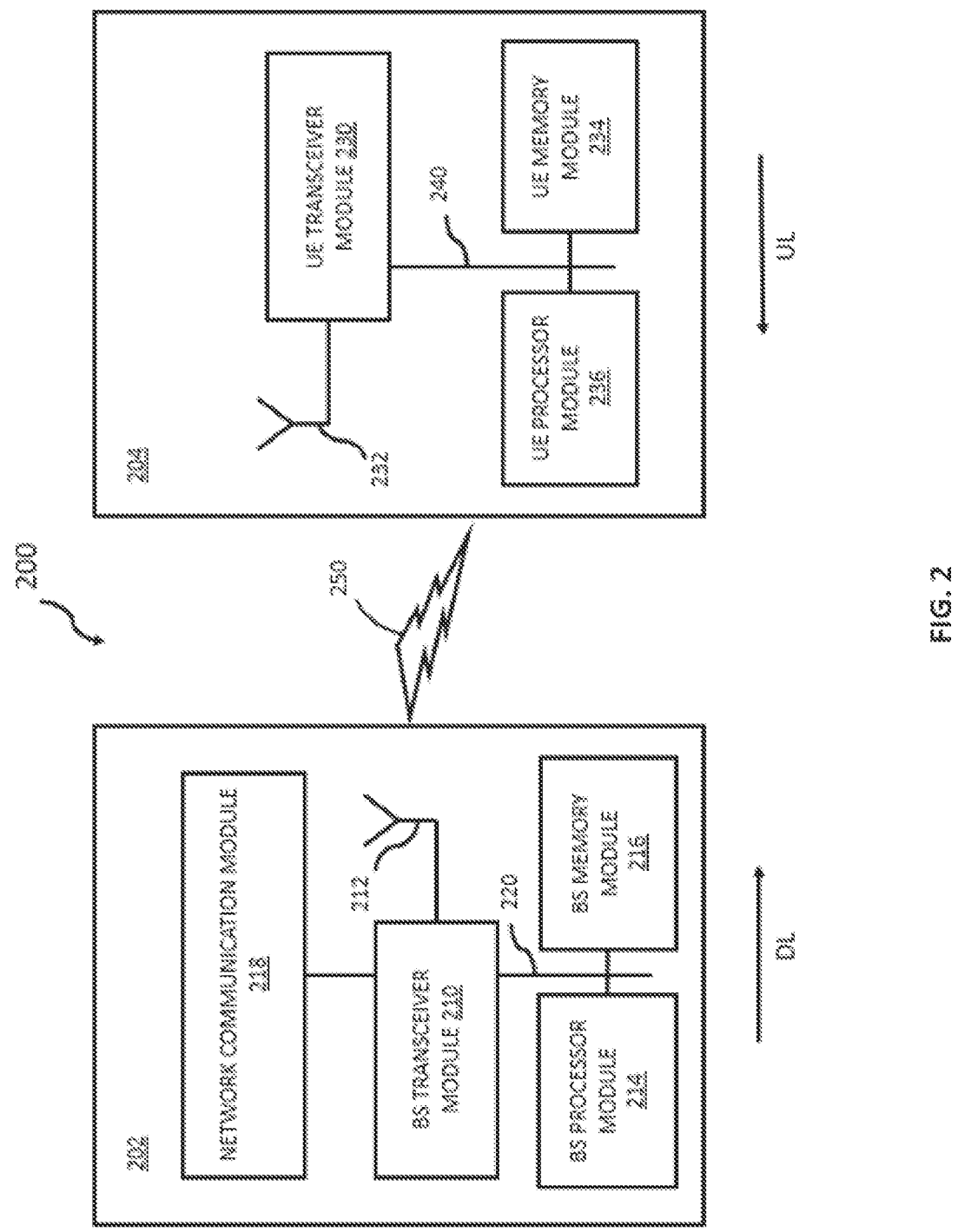
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Signal Transmission

In certain systems (e.g., rel-17 new radio access (NR) based systems and/or other systems), an increasing number of wireless communication devices (e.g., a UE, a terminal, or a served node) may be located in a serving cell (or other cells). In some embodiments, one or more wireless communication devices of a serving cell may receive/obtain one or more signals/transmissions/messages from a wireless communication node (e.g., a ground terminal, a base station, a gNB, an eNB, or a serving node). The one or more wireless communication devices of a serving cell may send/transmit/broadcast one or more signals (e.g., a sounding reference signal (SRS) and/or other signals) to the wireless communication node. In some embodiments, the one or more wireless communication devices may send/transmit/broadcast at least one SRS, such as an aperiodic SRS. If one or more wireless communication devices of a serving cell transmit at least one aperiodic SRS, signaling overhead may occur (e.g., signaling overhead of triggering one or more aperiodic SRSs).

In certain systems (e.g., long term evolution (LTE), new radio (NR) and/or other systems), the SRS may be utilized for uplink (UL) and/or downlink (DL) channel measurement. For example, the SRS (and/or other signaling) may be used to acquire/obtain one or more UL channel state measurements and/or other measurements. In certain systems with DL and UL slots in a same frequency band (e.g., time division duplexing (TDD) systems and/or other systems), the SRS can be utilized to acquire one or more DL channel state information (CSI) measurements and/or other measurements. In some embodiments, a SRS may be used to measure/acquire/determine CSI of a channel between the wireless communication node and the wireless communication device. In a LTE system, for example, the wireless communication device may transmit/send/broadcast an UL SRS on the last data symbol (or other symbols) of a sub-frame. The wireless communication device may transmit the UL SRS based on one or more parameters indicated/specified/provided by the wireless communication node. The one or more parameters may include a frequency band, a frequency domain position, a sequence cyclic shift, a period, a sub-frame offset, and/or other parameters indicated by the wireless communication node. In some embodiments, the wireless communication node may determine/measure CSI of one or more UL channels of the wireless communication device. The wireless communication node may determine/measure the CSI based on a received SRS (e.g., an aperiodic SRS). Responsive to determining/measuring the CSI, the wireless communication node may perform one or more operations according to the determined/measured CSI. For example, the wireless communication node may perform frequency selection and/or close-loop power control according to the determined CSI.

In some embodiments, the SRS can be transmitted/broadcast/sent according to one or more time domain types, such as a periodic SRS, a semi-persistent SRS, an aperiodic SRS, and/or other types. The time domain type may be configured and/or determined for a SRS resource set, the SRS resource set comprising one or more SRS resources. The SRS resource(s) may comprise one or more frequency-domain and/or time domain resources allocated for the SRS (e.g., a location in the time domain, a location in the frequency-domain, and/or other resources). Radio resource control (RRC) signaling and/or other types of signaling may be used to configure periodic SRS transmissions. In some embodiments, medium access control control element (MAC-CE) signaling (or other types of signaling) may be used to configure/trigger semi-persistent SRS transmissions. One or more SRS configurations may be configured via RRC signaling and/or other types of signaling. The one or more SRS configurations may include frequency resources, time domain resources (e.g., number of orthogonal frequency-division multiplexing (OFDM) symbols), periodicity, time offset (e.g., slot offset), and/or other SRS configurations. In some embodiments, the SRS configurations corresponding to aperiodic SRS transmissions may be configured by using RRC signaling, MAC-CE signaling, and/or other types of signaling. One or more aperiodic SRS transmissions can be activated/triggered/caused by downlink control information (DCI), such as a wireless communication device (e.g., UE) specific DCI and/or a common group DCI.

In certain systems, such as LTE release 10 based systems, at least one non-precoding SRS may be used in UL communications (e.g., antenna dedicated SRS). In some embodiments, a de-modulation reference signal (DMRS) of a physical uplink shared channel (PUSCH) may perform precoding in UL communications. The wireless communication node may receive/obtain the non-precoding SRS. Responsive to receiving the non-precoding SRS, the wireless communication node may estimate an original CSI. In some embodiments, the wireless communication node may be unable to estimate the original CSI based on a precoding DMRS. Therefore, the wireless communication device may use additional SRS resources when using one or more antennas to perform one or more non-precoding SRS transmissions. By using additional SRS resources when using one or more antennas for transmission (e.g., to perform one or more non-precoding SRS transmissions), the number of wireless communication devices simultaneously multiplexing in the wireless communication system may decrease. In some embodiments, the wireless communication device may send/transmit/broadcast a SRS configured with higher layer signaling (e.g., type-0 trigger) and/or DCI (e.g., type-1 trigger). Higher layer signaling (e.g., RRC signaling, MAC-CE signaling, and/or other types of signaling) may be used to configure periodic SRS transmissions. In some embodiments, DCI may be used to configure aperiodic SRS transmissions. Aperiodic SRS transmissions may provide improved/enhanced usage of SRS resources and/or flexibility for scheduling at least one SRS.

In certain systems (e.g., NR release 15 based systems), SRS usage can be classified into one or more categories (e.g., four categories). The one or more categories may include beam management, codebook based, non-codebook based, and/or antenna switching. Certain systems (e.g., NR) may support beam indication by informing/indicating the wireless communication device that a physical downlink shared channel (PDSCH) transmission and/or a physical downlink control channel (PDCCH) transmission uses the same transmission beam as a configured reference signal (e.g., channel state information reference signal (CSI-RS), synchronization signal (SS) block, and/or other reference signals). Therefore, beam indication may imply informing the wireless communication device that a PDSCH and/or PDCCH is transmitted/broadcasted using the same spatial filter as the configured reference signal. In some embodiments, beam indication can be based on the configuration and/or DL signaling of one or more transmission configuration indication (TCI) states. Each TCI state may include information of a reference signal (e.g., CSI-RS, SS block, and/or other reference signals). In some embodiments, a DL transmission (e.g., PDCCH, PDSCH, and/or other downlink transmissions) may be associated with at least one TCI. If a DL transmission is associated/linked/related to a TCI, the wireless communication node may inform/indicate the wireless communication device to assume the DL transmission is performed using the same spatial filter as the reference signal associated with the TCI.

In some embodiments, a wireless communication network and/or wireless communication node may include a base station of a macro cell (or other cells), a base station and/or transmission node of a small cell (or other cells), a sending node (or other nodes) in a high-frequency communication system (or other communication systems), a sending node (or other nodes) in an internet of things (IoT) system (or other systems), a satellite node, and/or other wireless communication nodes. A wireless communication device may include user equipment, such as a mobile phone/device and/or a portable device node in a communication system (e.g., a car and/or a satellite node).

In a wireless communication system, the wireless communication node may send DCI to one or more wireless communication devices to trigger/cause one or more aperiodic SRS transmissions. In some embodiments, a new/novel/enhanced/updated DCI may be used to trigger/cause one or more aperiodic SRS transmissions for one or more wireless communication devices. The systems and methods presented herein include a novel approach for reducing/decreasing the signaling overhead of triggering one or more aperiodic SRS transmissions and/or updating TCI states by at least 25% (e.g., 35, 45 or other percent) for example (e.g., by using the novel/enhanced DCI).

For example, a DCI (e.g., DCI with DCI format X, DCI with DCI format 2_3, and/or other DCIs with other DCI formats) may be used to transmit/send/broadcast a plurality of blocks (e.g., block number 1, block number 2, block number B, and/or other blocks). One or more blocks of the plurality of blocks may correspond/relate to a respective wireless communication device. In some embodiments, the wireless communication node may transmit the plurality of blocks by using DCI format X (e.g., DCI format 2_3, DCI format 2_7, DCI format 2_8, DCI format 2_9, and/or other DCI formats) with cyclic redundancy check (CRC) scrambled by TCI-SRS-RNTI and/or SRS-TCI-RNTI (where RNTI refers to radio network temporary identifier). In some embodiments, the wireless communication node may transmit the plurality of blocks by using DCI format 2_3 (or other DCI formats) with CRC scrambled by TPC-SRS-RNTI (TPC=transmit power control). The type of DCI format (e.g., DCI format 2_3, DCI format X, and/or other DCI formats) may determine/indicate the RNTI, wherein the RNTI can be used to encrypt the DCI. In some embodiments, the starting/initial position of a block can be determined/indicated/specified by at least one parameter (e.g., startingBitOfFormatX) of a higher layer (e.g., RRC layer, medium access control (MAC) layer, and/or other layers) signaling/configuration. The higher layer(s) signaling/configuration may provide/specify/indicate the parameter(s) to the wireless communication device(s) configured with each block (e.g., block number 1, block number 2, . . . , block number B). For example, a higher layer signaling/configuration may provide the value of the parameter startingBitOfFormatX to one or more wireless communication devices configured with block number B.

A. Scheme A

In some embodiments, at least one option (e.g., example implementation/embodiment) of one or more options discussed herein may be used for each block of the plurality of blocks.

a. Option 1: One Block Corresponds to a Component Carrier Set

In some embodiments, the wireless communication device (e.g., UE) may receive/obtain a configuration via higher layer signaling (e.g., RRC signaling and/or MAC layer signaling) to configure a parameter srs-TPC-PDCCH-Group as typeA, typeB, typeC and/or typeD. The wireless communication device may schedule/transmit one or more UL transmissions (e.g., PUSCH transmissions, physical uplink control channel (PUCCH) transmissions, and/or other transmissions) in a component carrier (CC) of the SRS. The wireless communication device may use the configured srs-TPC-PDCCH-Group parameter (or other parameters) to schedule/configure/support/transmit the one or more UL transmissions (e.g., setting to typeA, typeB, typeC and/or typeD can imply/indicate/represent/mean that PUSCH transmission(s) and/or PUCCH transmission(s) can be scheduled/supported in a CC of the SRS). In some embodiments, SRS power control may be tied/associated/related/linked/bound with PUSCH power control in an UL transmission. If SRS power control is tied/bound with PUSCH power control, higher layer signaling may be used to configure a first block (e.g., associated with at least one wireless communication device) of the plurality of blocks.

In some embodiments, a block (e.g., a first block) may comprise one or more fields. The one or more fields of the block may include a SRS request field, a plurality of TPC command fields, and/or other fields. The SRS request field may be associated/related/linked with a set of component carriers (CCs) of the wireless communication device. The SRS request field may use/occupy 0 or 2 bits (or other bits) of a block. In some embodiments, a higher layer parameter, such as fieldTypeFormatX, may determine/indicate whether a block includes/provides the SRS request field. For example, if the fieldTypeFormatX parameter has a value of 0 (or other numbers), the SRS request field may be excluded from the first block. In another example, if the fieldType-FormatX parameter has a value of 1 (or other numbers), the first block may include the SRS request field.

In some embodiments, each of the TPC command fields (e.g., TPC command number 1, TPC command number 2, TPC command number N, and/or other fields) of the plurality of TPC command fields may be associated/related/linked with a respective UL carrier and/or CC of a set of CCs. Therefore, for a set of CCs, each TPC command field may be associated with a CC of the CC set. In certain systems, the TPC command fields can be used for SRS power control. However, if SRS power control is tied/bound with PUSCH power control, SRS power control may be performed by using a PUSCH power control mechanism instead of the TPC command fields. Therefore, the TPC command fields may be available for indicating one or more associations/configurations (e.g., indicating a mapping between a TPC command field and a selected slotOffset). In some embodiments, a high layer parameter (e.g., cc-IndexI-nOneCC-Set and/or other parameters) may indicate/provide/specify/determine/configure the association between each TPC command field and the respective UL carrier and/or CC.

b. Option 2: One Block Corresponds to a Component Carrier

In some embodiments, the wireless communication device (e.g., UE) may receive/obtain a configuration via higher layer signaling (e.g., RRC signaling and/or MAC layer signaling) to configure a parameter srs-TPC-PDCCH-Group as typeA, typeB, typeC and/or typeD. The wireless communication device may schedule/transmit one or more UL transmissions (e.g., PUSCH transmissions, PUCCH transmissions, and/or other transmissions) in a CC of the SRS. The wireless communication device may use the configured srs-TPC-PDCCH-Group parameter (or other parameters) to schedule/transmit the one or more UL transmissions. In some embodiments, SRS power control may be tied with PUSCH power control in an UL transmission. If SRS power control is tied with PUSCH power control, higher layer signaling may be used to configure one or more blocks (e.g., associated with at least one wireless communication device). Each block of the one or more blocks may apply/correspond to an UL carrier and/or a CC. If the wireless communication device is associated/related/linked to more than one CC, more than one block may be configured for the CCs of the wireless communication device.

In some embodiments, each block of the one or more blocks (e.g., a first block) may comprise one or more fields. The one or more fields of each block may include a SRS request field, at least one TPC command field, and/or other fields. The SRS request field may be associated/related/linked with a CC of the wireless communication device. The SRS request field may use/occupy 0 or 2 bits (or other bits) of each block. In some embodiments, a higher layer parameter, such as fieldTypeFormatX, may determine/indicate whether each block includes/provides the SRS request field. For example, if the fieldTypeFormatX parameter has a value of 0 (or other numbers), the SRS request field may be excluded from a block. In another example, if the fieldType-FormatX parameter has a value of 1 (or other numbers), the block may include the SRS request field. In some embodiments, at least one TPC command field (e.g., a first TPC command field) may be associated/related/linked with all CCs of a set of CCs. Therefore, at least one TPC command field may be associated with a CC. In some embodiments, a TPC command field may use/occupy 2 bits (or other bits) of a block.

In one or more embodiments discussed herein, dynamic parameter selection (DPS) and/or other terminology may substitute the TPC command. In some embodiments, a usage/purpose/application of a TPC command field (e.g., a first TCP command field) may be configured/determined by one or more higher layer parameters. The usage/purpose/application of a TPC command field may be configured to comprise at least one of slotOffset, SRSFregDomainConfig, SRSTimedomainConfig, resourceMapping, TCI state, and/or SpatialRelationInfo.

In some embodiments, the usage/purpose/application of a configured TPC command field may indicate/provide/specify one or more configurations of a SRS. For example, the usage/purpose of SRSFreqDomainConfig may indicate/specify/provide the frequency domain configuration of the SRS. In one example, the usage of SRSTimedomainConfig may specify the time domain configuration of the SRS. In some embodiments, the usage of resourceMapping may indicate the mapping/association of a SRS resource in the time domain.

In some embodiments, a usage of a plurality of TPC command fields may be configured as slotOffset. A value of each of the plurality of TPC command fields may correspond/refer to a respective set of one or more slot offsets (or other time offsets). Referring now to FIG. 3, depicted is an example of a mapping or configuration 300 between TPC command field value(s) and one or more slotOffset values. For example, the usage of the plurality of TPC command fields may be configured as slotOffset. In the same example, a TPC command field value of 0 may indicate that the slotOffset(s) configured with a higher layer parameter (e.g., slotOffsetTrigger) are set to 0. The slotOffset(s) may be configured with at least one higher layer parameter, such as slotOffsetTrigger. In some embodiments, one or more values of slotOffset can be configured/determined in a SRS resource set. Each value of the one or more values of slotOffset may be configured with one or more trigger states. FIG. 3 depicts an example mapping between a TPC command field value and slotOffset values, wherein each value of slotOffset can be configured/associated/linked to one or more trigger states.

In some embodiments, the values of slotOffset may not be configured with one or more trigger states. Therefore, each value of the plurality of TPC command fields may correspond to a respective slotOffset value. Referring now to FIG. 4, depicted is an example of a mapping or configuration 400 between a TPC command field and a slotOffset. The configuration 400 illustrates an example mapping between a TPC command field value and a slotOffset value, wherein the slotOffset may not be configured with one or more trigger states (e.g., a one to one mapping between TPC command field and slotOffset). For example, a TPC command field value of 2 may indicate/specify/select a slotOffset value corresponding to a third slotOffset. In another example, a TPC command field value of 1 may specify/indicate/select a slotOffset value corresponding to a second slotOffset.

In some embodiments, a usage (e.g., purpose or application) of a plurality of TPC command fields may be configured as SpatialRelationInfo, TCI state, SRSTimedomainConfig and/or resourceMapping. The wireless communication device (e.g., UE) may be configured using one or more parameter sets comprising SpatialRelationInfo parameter sets (e.g., SRS-SpatialRelationInfo and/or SRS-SpatialRelationInfoPos-r16), TCI state parameter sets, and/or other parameter sets. Therefore, the wireless communication device may use a value of each of the plurality of TPC command fields to dynamically select/determine at least one of the one or more parameter sets (e.g., parameter sets of SpatialRelationInfo, TCI state, SRSTimedomainConfig, resourceMapping, and/or other parameter sets). The value of each of the plurality of TPC command fields may correspond to a respective parameter set of SpatialRelationInfo, TCI state, SRSTimedomainConfig and/or resourceMapping. One or more examples discussed herein may illustrate one or more parameter set configurations of a wireless communication device.

Example 1: SpatialRelationInfo Parameter Set

```
SRS-SpatialRelationInfo ::=        SEQUENCE {
    servingCellId                      ServCellIndex
OPTIONAL, -- Need SreferenceSignal     CHOICE {
        ssb-Index                          SSB-Index,
        csi-RS-Index                       NZP-CSI-RS-ResourceId,
        srs                                SEQUENCE {
            resourceId                         SRS-ResourceId,
            uplinkBWP                          BWP-Id
        }
    }
}
```

Example 2: SpatialRelationInfo Parameter Set

```
SRS-SpatialRelationInfoPos-r16    ::= SEQUENCE {
    servingCellId-r16                  ServCellIndex   OPTIONAL, --
Need S
    referenceSignal-r16                CHOICE {
        ssb-IndexServing-r16               SSB-Index,
        csi-RS-IndexServing-r16            NZP-CSI-RS-ResourceId,
        srs-SpatialRelation-r16            SEQUENCE {
            resourceSelection-r16              CHOICE {
                srs-ResourceId-r16                 SRS-ResourceId,
                srs-PosResourceId-r16              SRS-PosResourceId-r16
            },
            uplinkBWP-r16                      BWP-Id
        },
        ssbNcell-r16                       SSB-InfoNcell-r16,
        dl-PRS-r16                         DL-PRS-Info-r16
    }
}
```

Example 3: TCI State Parameter Set

```
    TCI-State ::=                      SEQUENCE {
        tci-StateId                        TCI-StateId,
        qcl-Type1                          QCL-Info,
        qcl-Type2                          QCL-Info
        OPTIONAL, -- Need R
        ...
    }
```

In some embodiments, the usage of the plurality of TPC command fields may be configured as SRSTimedomainConfig and/or resourceMapping. The wireless communication device (e.g., UE) may be configured using one or more parameter sets comprising a parameter set of resourceMapping, for example. Therefore, the wireless communication device may use a value of each of the plurality of TPC command fields to dynamically select/determine at least one of the one or more parameter sets (e.g., parameter set of resourceMapping, and/or other parameter sets). One or more examples discussed herein may illustrate one or more parameter set configurations (e.g., parameter set of resourceMapping) of a wireless communication device.

Example 4: resourceMapping Parameter Set

```
    resourceMapping                    SEQUENCE {
        startPosition                      INTEGER (0..5),
        nrofSymbols                        ENUMERATED {n1, n2, n4 },
        repetitionFactor                   ENUMERATED {n1, n2, n4 }
    },
```

B. Scheme B

In some embodiments, the wireless communication device (e.g., UE) may receive/obtain a configuration via higher layer signaling (e.g., RRC signaling and/or MAC layer signaling) to configure a parameter srs-TPC-PDCCH-Group as typeA, typeB, typeC and/or typeD. The wireless communication device may schedule/transmit one or more UL transmissions (e.g., PUSCH transmissions, PUCCH transmissions, and/or other transmissions) in a CC of the SRS. The wireless communication device may use the configured srs-TPC-PDCCH-Group parameter (or other parameters) to schedule, configure or enable support for the one or more UL transmissions. In some embodiments, SRS power control may not be tied/bound/associated/linked with PUSCH power control in an UL transmission. If SRS power control is not tied with PUSCH power control, higher layer signaling may be used to configure one or more blocks (e.g., associated with at least one wireless communication device). Each block of the one or more blocks may apply/correspond to an UL carrier and/or a CC.

In some embodiments, each block of the one or more blocks (e.g., a first block) may comprise one or more fields. The one or more fields of each block may include a SRS request field, at least one TPC command field, and/or other fields. The SRS request field may be associated/related/linked with a CC of the wireless communication device. If a wireless communication device uses one or more CCs, the wireless communication device may use at least one block for each CC. For example, if the wireless communication device uses two CCs, the wireless communication device may use two blocks (e.g., one block for each CC). Each block of each CC may include/provide/indicate/specify a SRS request field, at least one TPC command field, and/or other fields corresponding to the respective CC. The SRS request field may use/occupy 0 or 2 bits (or other bits) of each block. In some embodiments, a higher layer parameter, such as fieldTypeFormatX, may determine/indicate whether each block includes/provides the SRS request field. For example, if the fieldTypeFormatX parameter has a value of 0 (or other numbers), the SRS request field may be excluded from a block. In another example, if the fieldTypeFormatX parameter has a value of 1 (or other numbers), the block may include the SRS request field.

In some embodiments, at least one TPC command field (e.g., a first TPC command field) may be associated/related/linked with at least one CC of the wireless communication device. If SRS power control is not tied/bound with PUSCH power control, the TPC command field can be used for SRS power control. In some embodiments, a TPC command field may use/occupy 2 bits (or other bits) of a block.

In some embodiments, a value of the SRS request field may be used to trigger/cause the SRS in a CC. At least one PUSCH and/or PUCCH transmission can be scheduled in the CC. In some embodiments, the TPC command field may indicate/provide/specify an accumulated and/or absolute power of SRS transmissions, as shown in FIG. 5. For example, a TPC command field value of 0 (or other numbers) may indicate an absolute power of SRS transmission of −4 dB (or other numbers) and/or an accumulated power of SRS transmission of −1 dB (or other numbers). In another example, a TPC command field value of 2 (or other numbers) may specify an absolute power of SRS transmission of 1 dB (or other numbers) and/or an accumulated power of SRS transmission of 1 dB (or other numbers).

In some embodiments, each monitoring cell (e.g., CC) may monitor a PDCCH transmission (or other transmissions) to convey/indicate a corresponding DCI (e.g., SRS DCI format) to the wireless communication device. Each monitoring cell may comprise a corresponding CC in which at least one of the PUSCH transmission and/or a PUCCH transmission can be scheduled. In some embodiments, each such monitoring cell may be different from another monitoring cell for monitoring a PDCCH transmission (or other transmissions) to convey/indicate a corresponding DCI. The another monitoring cell may comprise a corresponding CC without a scheduled PUSCH transmission and/or PUCCH transmission. In some embodiments, the wireless communication node may convey/provide/indicate/specify/send the corresponding DCI (e.g., SRS DCI format) to the wireless communication device. The corresponding DCI may support triggering one or more PUCCH and/or PUSCH transmissions. The wireless communication node may provide the corresponding DCI with a CRC scrambled by a TPC-SRS-RNTI (e.g., specific type of RNTI).

C. Scheme C

In some embodiments, the wireless communication device (e.g., UE) may receive/obtain a configuration via higher layer signaling (e.g., RRC signaling and/or MAC layer signaling) to configure a parameter srs-TPC-PDCCH-Group as typeA, typeB, typeC and/or typeD. The wireless communication device may schedule/transmit one or more UL transmissions (e.g., PUSCH transmissions, PUCCH transmissions, and/or other transmissions) in a CC of the SRS. The wireless communication device may use the configured srs-TPC-PDCCH-Group parameter (or other parameters) to enable support for, schedule and/or configure the one or more UL transmissions. In some embodiments, SRS power control may not be tied/bound/associated/linked with PUSCH power control in an UL transmission. If SRS power control is not tied/bound with PUSCH power control, higher layer signaling may be used to configure a first block (e.g., associated with at least one wireless communication device).

In some embodiments, a block (e.g., a first block) may comprise one or more fields. The one or more fields of the block may include a SRS request field, a plurality of TPC command fields, and/or other fields. The SRS request field may be associated/related/linked with a set of CCs of the wireless communication device. The SRS request field may use/occupy 0 or 2 bits (or other bits) of a block. In some embodiments, a higher layer parameter, such as fieldType-FormatX, may determine/indicate whether a block includes/provides the SRS request field. For example, if the field-TypeFormatX parameter has a value of 0 (or other numbers), the SRS request field may be excluded from the first block. In another example, if the fieldTypeFormatX parameter has a value of 1 (or other numbers), the first block may include the SRS request field.

In some embodiments, each of the TPC command fields (e.g., TPC command number 1, TPC command number 2, TPC command number N, and/or other fields) of the plurality of TPC command fields may be associated/related/linked with a respective UL carrier and/or CC of a set of CCs. Therefore, for a set of CCs, each TPC command field may be associated with a CC of the CC set. In certain systems, the TPC command fields can be used for SRS power control. In some embodiments, a high layer parameter (e.g., cc-IndexInOneCC-Set and/or other parameters) may indicate/provide/specify/determine/configure the association between each TPC command field and the respective UL carrier and/or CC.

In some embodiments, at least one of a PUSCH transmission and/or PUCCH transmission may be scheduled in a CC set. A CC set with PUCCH and/or PUSCH transmissions may be different from another CC set without PUCCH and/or PUSCH transmissions. In some embodiments, one or more monitoring cells may monitor one or more PDCCH transmissions that convey/indicate/provide one or more corresponding DCIs (e.g., SRS DCI format). The monitoring cell(s) may comprise the CC set in which at least one of the PUSCH transmissions and/or the PDSCH transmissions can be scheduled. The one or more monitoring cells may be different from other monitoring cells for monitoring a PDCCH transmission to convey a corresponding DCI. The other monitoring cells may comprise a corresponding CC without the PUSCH transmissions and/or PUCCH transmissions. In some embodiments, the wireless communication node may convey/provide/indicate/specify/send the corresponding DCI(s) (e.g., SRS DCI format) to the wireless communication device. The corresponding DCI(s) may support triggering one or more PUCCH and/or PUSCH transmissions. The wireless communication node may provide the corresponding DCI(s) with a CRC scrambled by a TPC-SRS-RNTI (e.g., specific type of RNTI for a corresponding DCI format).

D. Methods for Signal Transmission

Figure 6:
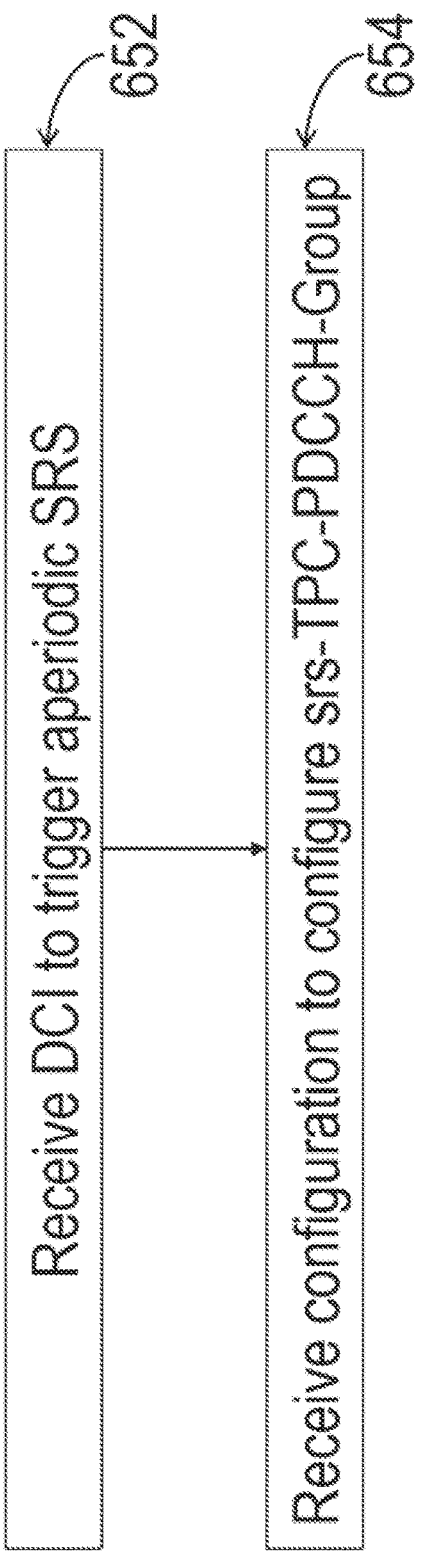
FIG. 6 illustrates a flow diagram of an example method for signal transmission, in accordance with an embodiment of the present disclosure.

FIG. 6 illustrates a flow diagram of a method 650 for signal transmission. The method 650 may be implemented using any of the components and devices detailed herein in conjunction with FIGS. 1-5. In overview, the method 650 may include receiving DCI to trigger an aperiodic SRS (652). The method 650 may include receiving a configuration to configure parameter srs-TPC-PDCCH-Group (654).

Referring now to operation (652), and in some embodiments, a wireless communication device (e.g., a UE) may receive/obtain DCI to trigger/cause an aperiodic SRS. The wireless communication node may send/transmit/broadcast the DCI to the wireless communication device. In some embodiments, at least one DCI may trigger an aperiodic SRS in one or more wireless communication devices. The DCI (e.g., DCI format 2_3 with CRC scrambled by TPC-SRS-RNTI and/or other DCIs) may include/provide/comprise a plurality of blocks (e.g., block number 1, block number, block number 3, and/or other blocks). One or more blocks of the plurality of blocks may correspond to a respective wireless communication device. In some embodiments, SRS power control may be tied/bound to PUSCH power control. If SRS power control is tied to PUSCH power control, a first block of the plurality of blocks may include/comprise/indicate a SRS request field, a plurality of TPC command fields, and/or other fields. The SRS request field may be associated/linked/related with a set of CCs of the wireless communication device. The plurality of TPC command fields (e.g., TPC command number 1, TPC command number 2, and/or other TPC command fields) may include a first TPC command field. Each of the TPC command fields of the plurality of TPC command fields may be associated/linked/related with a respective CC of the set of CCs.

In some embodiments, if SRS power control is tied/bound to PUSCH power control, a first block of the plurality of blocks of the DCI may comprise/include a SRS request field, a first TPC command field, and/or other fields. Higher layer signaling (e.g., RRC signaling) may be used to configure the one or more fields of the first block. The SRS request field (e.g., 0 or 2 bits of the DCI) can be associated/related/linked with a CC of the wireless communication device. In some embodiments, a higher layer parameter, such as fieldType-FormatX, may determine/indicate whether the first block includes/provides the SRS request field. The first TPC command field (e.g., 2 bits of the DCI) may be associated with the CC of the wireless communication device.

In some embodiments, a usage (or purpose/application) of the first TPC command field may be configured to comprise at least one of a slotOffset, SRSFreqDomainConfig, SRSTimedomainConfig, resourceMapping, TCI state, and/or SpatialRelationInfo. A higher layer parameter may be used to configure the usage of the first TPC command field (or other TPC command fields). The usage of the TPC command field may indicate/provide/specify one or more SRS configurations (e.g., frequency domain configuration and/or time domain configuration) and/or at least one mapping (e.g., SRS resource mapping in the time domain). In some embodiments, a usage of the plurality of TPC command fields may be configured as slotOffset. If the usage is configured as slotOffset, a value of each of the plurality of TPC command fields may correspond to a respective set of one or more slot offsets. For example, each value of slot-Offset may be configured with one or more trigger states, wherein a value of a TPC command field (e.g., TPC command field value of 0 or other numbers) maps/relates/links to one or more slotOffsets.

In some embodiments, a usage of the plurality of TPC command fields may be configured as SpatialRelationInfo, TCI state, SRSTimedomainConfig and/or resourceMapping. A value of each of the plurality of TPC command fields (e.g., configured as SpatialRelationInfo, TCI state, and/or others) may correspond to a respective parameter set of SpatialRelationInfo, TCI state, SRSTimedomainConfig and/or resourceMapping. In some embodiments, a value of a TPC command field may indicate/specify at least one of the respective parameter sets to the wireless communication device. The wireless communication device may select the parameter set indicated/specified by the value of the TPC command field.

In some embodiments, SRS power control may not be tied with PUSCH power control. If SRS power control is not tied with PUSCH power control, a first block of the plurality of blocks of the DCI may include a SRS request field, a first TPC command field, and/or other fields. The SRS request field and/or the first TPC command field may be linked/associated/related with a CC of the wireless communication device. In some embodiments, a higher layer parameter (e.g., fieldTypeFormatX) may indicate/specify whether the SRS request field is included in the first block. In some embodiments, a value of the SRS request field may be used to trigger/cause a SRS in the CC of the wireless communication device. At least one of a PUSCH transmission and/or PUCCH transmission may be scheduled in the CC of the wireless communication device. In some embodiments, each monitoring cell (e.g., a CC) may monitor one or more PDCCH transmissions (or other transmissions) that indicate/convey/specify a corresponding DCI. The wireless communication node may transmit/send/broadcast the PDCCH (or other transmissions) to convey the corresponding DCI (e.g., SRS DCI format) to the wireless communication device. The wireless communication node may provide/indicate/specify the corresponding DCI with CRC scrambled by a TPC-SRS-RNTI (e.g., specific type of RNTI). The corresponding DCI may support triggering one or more PUSCH transmissions, PUCCH transmissions, and/or other transmissions. Each monitoring cell may comprise a corresponding CC in which at least one of the PUSCH transmission and/or PUCCH transmission can be scheduled. In some embodiments, each monitoring cell may be different/distinct/separate from another monitor cell. The another monitoring cell may monitor a PDCCH transmission (or other transmissions) to convey a corresponding DCI (e.g., SRS DCI format). The another monitoring cell may comprise a corresponding CC without the scheduled PUSCH transmission, PUCCH transmission, and/or other transmissions.

In some embodiments, SRS power control may not be tied/bound/associated with PUSCH power control. If SRS power control is not tied with PUSCH power control, a first block of the plurality of blocks of the DCI may comprise/include/provide a SRS request field, a plurality of TPC command fields, and/or other fields. The SRS request field may be associated/related/linked with a set of CCs of the wireless communication device. The plurality of TPC command fields (e.g., TPC command number 1, TPC command number 2, and/or other TPC command fields) may include a first TPC command field (or other fields). Each of the TPC command fields of the plurality of TPC command fields may be associated/related/linked with a respective CC of the set of CCs of the wireless communication device. In some embodiments, at least one of a PUSCH transmission, PUCCH transmission, and/or other transmissions may be scheduled in the CC set of the wireless communication device. In some embodiments, monitoring cells (e.g., CCs) may monitor one or more PDCCH transmissions that convey/specify/indicate one or more corresponding DCIs. The wireless communication node may send/transmit/broadcast the corresponding DCIs with CRC scrambled by TPC-SRS-RNTI. The monitoring cells may comprise the CC set of the wireless communication device. The at least one PUSCH transmission, PUCCH transmission, and/or other transmissions may be scheduled in the CC set. These monitoring cells may be different/distinct/separate/distinguished from another monitoring cell for monitoring a PDDCH transmission (or other transmissions). The PDCCH transmission may convey/indicate/specify/provide a corresponding DCI. The another monitoring cell may comprise a corresponding CC without the scheduled PUSCH transmission, PUCCH transmissions, and/or other transmissions.

Referring now to operation (654), and in some embodiments, the wireless communication device may receive/obtain a configuration via higher layer signaling (e.g., RRC signaling, MAC layer signaling, and/or other types of signaling). The wireless communication node may use higher layer signaling (or other types of signaling) to send/transmit/broadcast the configuration to the wireless communication device. The wireless communication device may receive/obtain the configuration to configure parameter srs-TPC-PDCCH-Group as typeA, typeB, typeC and/or typeD (e.g., srs-TPC-PDCCH-Group=typeC and/or srs-TPC-PDCCH-Group=typeD). In some embodiments, the wireless communication device may schedule/transmit at least one of a PUSCH transmission, a PUCCH transmission, and/or other transmissions in a CC of the SRS to the wireless communication node (e.g., in accordance with the configured parameter srs-TPC-PDCCH-Group). The wireless communication node may receive/obtain the configured parameter srs-TPC-PDCCH-Group (or other parameters) from the wireless communication device to schedule at least one transmission (e.g., PUSCH, PUCCH, and/or other transmissions). The wireless communication device may schedule/transmit the at least one transmission to the wireless communication node according to the configured parameter srs-TPC-PDCCH-Group (or other parameters).

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
receiving, by a wireless communication device from a wireless communication node, downlink control information (DCI) to trigger an aperiodic sounding reference signal (SRS),
wherein the DCI comprises a plurality of blocks, each one or more blocks of the plurality of blocks for a respective wireless communication device, wherein
when SRS power control is tied with a physical uplink shared channel (PUSCH) power control, a first block of the plurality of blocks comprises:
a SRS request field associated with for a component carrier (CC) of a set of CCs of the wireless communication device, and
a first transmit power control (TPC) command field for the set of CCs.

2. The method of claim 1, comprising:
receiving, by the wireless communication device from the wireless communication node, a configuration via higher layer signaling to configure parameter srs-TPC-PDCCH-Group as typeA, typeB, typeC or typeD.

3. The method of claim 1, comprising:
transmitting, by the wireless communication device to the wireless communication node, according to a configured parameter srs-TPC-PDCCH-Group, at least one of a PUSCH transmission or a physical uplink control channel (PUCCH) transmission, in a CC of the SRS.

4. The method of claim 1, wherein a usage of the first TPC command field is configured to comprise at least one of: slotOffset, SRSFreqDomainConfig, SRSTimedomainConfig, resourceMapping, TCI state, or SpatialRelationInfo.

5. The method of claim 1, wherein the first TPC command field is one of a plurality of TPC command fields, wherein a usage of the plurality of TPC command fields is configured as slotOffset, and a value of each of the plurality of TPC command fields corresponds to a respective set of one or more slot offsets.

6. The method of claim 1, wherein the first TPC command field is one of a plurality of TPC command fields, wherein a usage of the plurality of TPC command fields is configured as SpatialRelationInfo, TCI state, SRSTimedomainConfig or resourceMapping, and a value of each of the plurality of TPC command fields corresponds to a respective parameter set of SpatialRelationInfo, TCI state, SRSTimedomainConfig or resourceMapping.

7. The method of claim 1, wherein when SRS power control is not tied with a PUSCH power control, a first block of the plurality of blocks comprises:
a SRS request field associated with a CC of the wireless communication device, and
a first TCP command field associated with the CC.

8. Then method of claim 7, wherein:
a value of the SRS request field is used to trigger the SRS in the CC in which at least one of a PUSCH transmission or a physical uplink control channel (PUCCH) transmission can be scheduled, or
each monitoring cell for monitoring a physical downlink control channel (PDCCH) transmission to convey a corresponding DCI comprises a corresponding CC in which at least one of the PUSCH transmission or a PUCCH transmission can be scheduled, is different from a monitoring cell for monitoring a PDCCH transmission to convey a corresponding DCI which comprises a corresponding CC without the PUSCH transmission or the PUCCH transmission scheduled.

9. The method of claim 1, wherein when SRS power control is not tied with a PUSCH power control, a first block of the plurality of blocks comprises:
a SRS request field associated with a set of CCs of the wireless communication device, and
a plurality of TPC command fields including a first TPC command field, each of the TPC command fields associated with a respective CC of the set of CCs.

10. Then method of claim 9, wherein:
at least one of a PUSCH transmission or a physical uplink control channel (PUCCH) transmission can be scheduled in the CC set, or
monitoring cells for monitoring physical downlink control channel (PDCCH) transmissions to convey corresponding DCIs comprise the CC set in which at least one of the PUSCH transmission or the PUCCH transmission can be scheduled, are different from a monitoring cell for monitoring a PDCCH transmission to convey a corresponding DCI which comprises a corresponding CC without the PUSCH transmission or the PUCCH transmission scheduled.

11. A method comprising:
transmitting, by a wireless communication node to a wireless communication device, downlink control information (DCI) to trigger an aperiodic sounding reference signal (SRS),
wherein the DCI comprises a plurality of blocks, each one or more blocks of the plurality of blocks for a respective wireless communication device, wherein when SRS power control is tied with a physical uplink shared channel (PUSCH) power control, a first block of the plurality of blocks comprises:

a SRS request field for a component carrier (CC) of a set of CCs of the wireless communication device, and a first transmit power control (TPC) command field for the set of CCs.

12. The method of claim 11, comprising:

transmitting, by the wireless communication node to the wireless communication device, a configuration via higher layer signaling to configure parameter srs-TPC-PDCCH-Group as typeA, typeB, typeC or typeD.

13. The method of claim 11, comprising:

receiving, by the wireless communication node from the wireless communication device, a configured parameter srs-TPC-PDCCH-Group to schedule at least one of a PUSCH transmission or a physical uplink control channel (PUCCH) transmission, in a CC of the SRS.

14. The method of claim 11, wherein a usage of the first TPC command field is configured to comprise at least one of: slotOffset, SRSFreqDomainConfig, SRSTimedomain-Config, resourceMapping, TCI state, or SpatialRelationInfo.

15. A wireless communication device, comprising:

at least one processor configured to:

receive, via a receiver from a wireless communication node, downlink control information (DCI) to trigger an aperiodic sounding reference signal (SRS), wherein the DCI comprises a plurality of blocks, each one or more blocks of the plurality of blocks for a respective wireless communication device, wherein when SRS power control is tied with a physical uplink shared channel (PUSCH) power control, a first block of the plurality of blocks comprises:

a SRS request field associated with for a component carrier (CC) of a set of CCs of the wireless communication device, and a first transmit power control (TPC) command field associated with for the set of CCs.

16. A wireless communication node, comprising:

at least one processor configured to:

transmit, via a transmitter to a wireless communication device, downlink control information (DCI) to trigger an aperiodic sounding reference signal (SRS), wherein the DCI comprises a plurality of blocks, each one or more blocks of the plurality of blocks for a respective wireless communication device, wherein when SRS power control is tied with a physical uplink shared channel (PUSCH) power control, a first block of the plurality of blocks comprises:

a SRS request field associated with for a component carrier (CC) of a set of CCs of the wireless communication device, and a first transmit power control (TPC) command field associated with for the set of CCs.

* * * * *